United States Patent Office 3,690,862
Patented Sept. 12, 1972

3,690,862
2,2,5,5-TETRAKIS(POLYHALOMETHYL)-
4-OXAZOLIDINONE HERBICIDES
William J. Middleton, Wilmington, Del., assignor to E. I.
du Pont de Nemours and Company, Wilmington, Del.
No Drawing. Filed July 3, 1969, Ser. No. 839,054
Int. Cl. A01n 9/00
U.S. Cl. 71—88  6 Claims

ABSTRACT OF THE DISCLOSURE 2,2,5,5 - tetrakis(polyhalomethyl) - 4 - oxazolidinones have been found to be useful as herbicides for the control of undesired vegetation. Illustrative of such oxazolidinones are (i) 2,5 - bis(difluoromethyl) - 2,5 - bis(trifluoromethyl) - 4 - oxazolidinone and (ii) 2,2,5,5 - tetrakis(difluoromethyl)-4-oxazolidinone.

DESCRIPTION OF THE INVENTION

Summary

The present invention is directed to the use as herbicides of 4-oxazolidinones having the formula:

I.

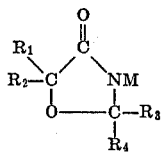

M is selected from the group consisting of hydrogen, an alkali metal ion, an alkaline earth metal ion, and

where $R_5$, $R_6$, $R_7$ and $R_8$ are the same or different and are selected from the group consisting of hydrogen, alkyl having 1 to 4 carbon atoms, and alkyl having 1 to 4 carbon atoms substituted with one hydroxy group, and $R_1$, $R_2$, $R_3$, and $R_4$ are the same or different and are selected from the group consisting of trifluoromethyl, difluoromethyl, and chlorodifluoromethyl.

The preferred compounds because of their herbicidal activity are those compounds having 8 to 10 fluorine atoms.

Method for making the 4-oxazolidinone

The compounds used in this invention can be prepared from two equivalents of either a fluorinated or chlorofluorinated acetone (or one equivalent each of two fluorinated or chlorofluorinated acetones) and one equivalent of hydrocyanic acid or a hydrocyanic acid salt, such as sodium cyanide or tetraethylammonium cyanide in a solvent, such as acetonitrile according to the following equations:

(1)

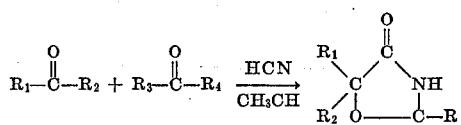

(2)

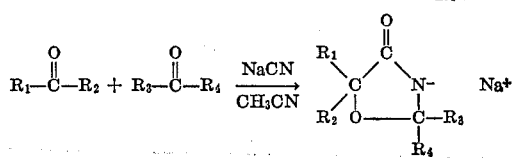

(3)

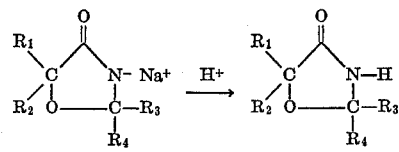

This reaction is described in detail for the preparation of 2,2,5,5 - tetrakis(trifluoromethyl) - 4 - oxazolidinone in U.S. Pat. 3,310,570 issued Mar. 21, 1967 to Middleton, the disclosure of which is incorporated herein by reference.

The compounds of this invention in which M is other than hydrogen can also be prepared by reaction of a compound where M is hydrogen with an alkali metal or alkaline earth metal alkoxide, hydroxide or carbonate or with ammonia or an amine. Alternatively, those compounds in which M is sodium ion can be prepared by eliminating the acidification steps from the above reaction sequence (2). This latter procedure is also described in U.S. Pat. 3,310,570.

The compounds of this invention can exist in more than one stereoisomeric form. The structure of Formula I as depicted is used for brevity, but it is to be understood that this invention includes all stereoisomeric variations of Formula I.

The following examples are illustrative of methods by which the compounds of this invention can be prepared. Parts and percentages are by weight unless otherwise specified. In some examples, both parts by weight and parts by volume appear.

EXAMPLE 1

Preparation of 2,5-bis(difluoromethyl)-2,5-bis(trifluoromethyl)-4-oxazolidinone, cis-trans mixture A sample of pentafluoroacetone (50 parts by volume, measured at −78° C.) is slowly distilled into a stirred suspension of 13.44 parts of powdered sodium cyanide in 157 parts of acetonitrile. The reaction mixture is held at −30° during the addition (which requires about 1 hr.) and for another hour; the temperature is then allowed to come to 25° overnight. The colorless solution is added to 200 ml. 10% HCl and shaken. The lower organic layer is separated and washed four times with water (about 1¾ liter total volume) to remove acetonitrile. On the fourth washing, the product precipitates and is filtered and washed with water. The white crystalline solid is purified by recrystallization from benzene-hexane and by sublimation to give 78 parts of white crystalline 2,5-bis (difluoromethyl) - 2,5 - bis(trifluoromethyl) - 4 - oxazolidinone is obtained: M.P. 93–94° (sublimed); 91.5–93° (recrystallized). The product is identified by hydrogen and fluorine nuclear magnetic resonance spectroscopy, infrared analysis, and elemental analysis.

EXAMPLE 2

Separation of the cis and trans isomers of 2,5-bis(difluoromethyl)-2,5-bis(trifluoromethyl)-4-oxazolidinone Approximately equal amounts of the pure cis and trans isomers are obtained by gas chromatographic separation on an 8 ft. column of 25% fluorosilicone on Chrom W at 100° C. The following data are obtained for the two isomers:

(1) (shorter retention time)

M.P. 92.2–93°

$^1$H NMR (DMSO-$d_6$): −0.2τ (multiplet, 1H); triplets centered at 3.14τ and 3.38τ (J=51 Hz., 2H)

$^{19}$F NMR (DMSO-$d_6$, CCl$_3$F internal std.): 72.9 p.p.m. (multiplet, 3F); 78.4 p.p.m. (multiplet, 3F); 133 p.p.m. (multiplet, 4F)

(2) (longer retention time)

M.P. 93–94°

$^1$H NMR (DMSO-d$_6$): triplets centered at 3.19 and 3.38τ (J=51 Hz., 2H); n-H proton not detected in 500 Hz. scan $^{19}$F NMR (DMSO-d$_6$, CCl$_3$F internal std.): 72.6 p.p.m. (quintet, J=9 Hz., 3F); 77.9 p.p.m. (2 overlapping quartets, J$_1$=9 Hz., J$_2$=13 Hz., 3F); 133 p.p.m. (multiplet, 4F)

EXAMPLE 3

Preparation of 2,2,5,5-tetrakis(difluoromethyl)-4-oxazolidinone

A sample of s-tetrafluoroacetone, 65 parts is added portionwise during a 1-hour period to a suspension of 12.5 parts of powdered sodium cyanide in 78 parts of acetonitrile. The temperature is maintained below 40° C. by cooling in an ice bath. After the addition the mixture is stirred for 30 minutes, and then poured into 500 parts of water containing 68 parts of concentrated hydrochloric acid. The oily layer that separates is washed with water and then dissolved in aqueous 5% sodium hydroxide. This solution is filtered to remove undissolved material and then acidified with aqueous 5% hydrochloric acid. The solid that precipitates is collected on a filter, washed with water, and recrystallized from benzene to give 16.1 parts of the oxazolidinone as colorless needles, M.P. 122–124° C. Sublimation at 120° C. (5 mm.) gives a purer product: M.P. 123–125° C.

Analysis.—Calcd. for C$_7$H$_5$F$_8$NO$_2$ (percent): C, 29.28; H, 1.76; F, 52.96; N, 4.88. Found (percent): C, 29.80; H, 1.90; F, 52.46; N, 4.61.

EXAMPLE 4

Preparation of 2-difluoromethyl-2,5,5-tris(trifluoromethyl)-4-oxazolidinone

Hexafluoroacetone, 5.5 parts by volume, is distilled into a solution of 7.8 parts of tetraethylammonium cyanide in 39 parts of acetonitrile cooled to −20° C. Pentafluoroacetone, 6 parts by volume, is then distilled into the reaction mixture at −20° C. The reaction mixture is stirred at 25° C. for 18 hours, poured into 100 parts of water, and then acidified with concentrated hydrochloric acid. The organic layer is separated, dried over anhydrous magnesium sulfate and then allowed to evaporate at room temperature until crystals form. The crystals are collected on a filter, recrystallized from benzene, sublimed at 135° C. (2 mm.), and resublimed at 120° C. (2 mm.) to give 8.26 parts (40% yield) of 2-difluoromethyl-2,5,5-tris(trifluoromethyl)-4-oxazolidinone: M.P. 100–101° C.

Analysis.—Calcd. for C$_7$F$_{11}$H$_2$NO$_2$ (percent): C, 24.65; H, 0.59; F, 61.27; N, 4.11. Found (percent): C, 25.38; H, 1.12; F, 60.98; N, 4.88.

EXAMPLE 5

Preparation of 2,5-bis(chlorodifluoromethyl)-2,5-bis(difluoromethyl)-4-oxazolidinone A sample of 1-chloro-1,1,3,3-tetrafluoroacetone (46 parts) is added dropwise to a stirred solution of 21.45 parts of tetraethylammonium cyanide in 78 parts of acetonitrile at −30°. After the addition, which requires about 20 min., the solution is stirred at −30° for 1.5 hr., then brought to room temperature over a period of 1 hr. The solution is poured into 100 ml. of 10% HCl solution, shaken, and the lower organic phase which separates and is washed four times with water to remove acetonitrile. The viscous organic layer is diluted with ether, dried over MgSO$_4$ and the solvent is removed by distillation. The crude product is distilled (B.P. 88–100° at 1.8 mm.). The nearly colorless distillate solidifies on cooling and is further purified by sublimation. A white solid (6.3 parts) is obtained: M.P. 33–36°.

Analysis.—Calcd. for C$_7$H$_3$O$_2$NCl$_2$F$_8$ (percent): C, 23.61; H, 0.85; N, 3.94. Found (percent): C, 23.90; H, 0.90; N, 3.89.

EXAMPLE 6

2,5-bis(chlorodifluoromethyl)-2,5-bis(trifluoromethyl)-4-oxazolidinone

A sample of chloropentafluoroacetone (25 parts by volume) is slowly distilled into a stirred solution of 15.6 parts of tetraethylammonium cyanide in 1.57 parts of acetonitrile. Cooling is applied to keep the reaction temperature between 20–30°. The reaction mixture is stirred overnight and then acidified with 200 parts of 10% hydrochloric acid. The organic layer is separated and washed several times until it becomes very viscous. It is then dissolved in 100 parts of 5% sodium hydroxide and reprecipitated by addition of 100 parts of 10% hydrochloric acid. The solid that forms upon standing is recrystallized from pentane and then sublimed at 80° (10 mm.) to give 11.9 parts of the oxazolidinone as colorless crystals: M.P. 87–89°.

Analysis.—Calcd. for C$_7$HCl$_2$F$_{10}$NO$_2$ (percent): C, 21.45; H, 0.26; Cl, 18.09; F, 48.47; N, 3.57. Found (percent): C, 21.53; H, 0.33; Cl, 17.99; F, 48.43; N, 3.45.

By replacing the chloropentafluoroacetone of the above example with an equivalent amount of s-dichlorotetrafluoroacetone, 2,2,5,5 - tetrakis(chlorodifluoromethyl)-4-oxazolidinone is prepared.

EXAMPLE 7

Preparation of 2,5-bis(difluoromethyl)-2,5-bis(trifluoromethyl)-4-oxazolidinone, sodium salt Fifteen parts of 2,5-bis(difluoromethyl)-2,5-bis(trifluoromethyl)-4-oxazolidinone is dissolved in 7.92 parts of methanol. A solution of 2.61 parts of sodium methoxide in 119 parts of methanol is added with stirring, and the methanol evaporated in an air stream. The sticky residue is vacuum-dried, triturated with a small amount of warm benzene, filtered to remove traces of unconverted oxazolidinone, and air-dried, leaving the sodium salt of 2,5-bis(difluoromethyl) - 2,5 - bis(trifluoromethyl)-4-oxazolidinone, which can be formulated and applied as described hereinafter.

EXAMPLE 8

Preparation of 2,2,5,5-tetrakis(difluoromethyl)-4-oxazolidinone, potassium salt

To 31 parts of 2,2,5,5-tetrakis(difluoromethyl)-4-oxazolidinone in 200 parts of water is added 100 parts by volume of 1.0 N aqueous potassium hydroxide. The resulting solution is evaporated to dryness leaving as a solid, the potassium salt of 2,2,5,5-tetrakis(difluoromethyl)-4-oxazolidinone.

The following salts can be prepared by replacing the 2,2,5,5 - tetrakis(difluoromethyl) - 4 - oxazolidinone and potassium hydroxide of Example 8 with equivalent amounts of the oxazolidinones and bases shown below.

| Example | Oxazolidinone | Base | Salt product |
| --- | --- | --- | --- |
| 9 | 2,2,5,5-tetrakis(difluoromethyl)-4-oxazolidinone | Dimethylamine | 2,2,5,5-tetrakis(difluoromethyl)-4-oxazolidinone, dimethylammonium salt. |
| 10 | do | Calcium hydroxide | 2,2,5,5-tetrakis(difluoromethyl)-4-oxazolidinone, calcium salt. |
| 11 | do | Sodium carbonate | 2,2,5,5-tetrakis(difluoromethyl)-4-oxazolidinone, sodium salt. |
| 12 | 2,5-bis(difluoromethyl)-2,5-bis(trifluoromethyl)-4-oxazolidinone. | Triethanolamine | 2,5-bis(difluoromethyl)-2,5-bis(trifluoromethyl)-4-oxazolidinone, triethanolammonium salt. |
| 13 | do | Barium hydroxide | 2,5-bis(difluoromethyl)-2,5-bis(trifluoromethyl)-4-oxazolidinone, barium salt. |
| 14 | do | Methylamine | 2,5-bis(difluoromethyl)-2,5-bis(trifluoromethyl)-4-oxazolidinone, methylammonium salt. |
| 15 | 2,5-bis(chlorodifluoromethyl)-2,5-bis(trifluoromethyl)-4-oxazolidinone. | Ammonia | 2,5-bis(chlorodifluoromethyl)-2,5-bis(trifluoromethyl)-4-oxazolidinone, ammonium salt. |

Utility of the oxazolidinones

The oxazolidinones of Formula I are active herbicides useful for controlling undesirable vegetation. Their pre-emergence and post-emergence activity on a wide range of plant species make these compounds useful in both crop and non-crop situations.

The amount of herbicide required is referred to herein as "a herbicidally effective amount." This amount is governed by soil type, climate, and type of application. Generally speaking, however, the oxazolidinones are used for selective weeding of crops at the rate of 1.0 to 4.5 kilograms per hectare. Rates of 9 to 27 kilograms per hectare are generally satisfactory for non-crop weed control such as on railroad ballast, fence rows and industrial sites.

When applied pre-emergence to the weeds many serious weed species are controlled. These include such weeds as nutsedge (Cyperus sp.), Common Crabgrass (*Digitaria sanguinalis*), foxtails (Setaria sp.), Johnsongrass (*Sorghum helepense*), teaweed (*Sida spinosa*), Cheat (*Bromus secalinus*), barnyardgrass (*Echinochlca crusgalli*), Common ragweed (*Ambrosia artemisiifolia*), and velvetleaf (*Abutilon theophrasti*).

The oxazolidinones discolsed herein also control many weeds when applied post-emergence. The compounds should be applied when the weeds are small and thorough coverage of the foliage is essential for good control. When applied in this manner these compounds control such weeds as sheep sorrel (*Rumex acetosella*), ryegrass (*Lolium multiflorum*), dandelion (*Taraxacum offcinale*), goosegrass (*Eleusine indica*), pigweed (Amaranthus sp., yellow rocket (Barbarea vulgaris), chickweed, *Stellaria media*), witchgrass (*Panicum capillare*), henbit (*Lamium amplexicaule*), lambsquarters (*Chenopodium album*), plantain (Plantago sp.), morningglory (Ipomoea sp.) and common mallow (*Malva neglecta*).

Compositions

Herbicidal compositions can be prepared by mixing at least one of the compounds of Formula I with pest control adjuvants or modifiers to provide compositions in the form of dusts, granules, pellets, water-dispersible powders, high-strength concentrates, aqueous solutions, aqueous dispersions or emulsions, and solutions or dispersions in organic liquids.

Thus, the compounds of Formula I can be used with a carrier or diluent agent such as a finely divided solid, an organic liquid, water, a wetting agent, a dispersing agent, an emulsifying agent or any suitable combination of these.

Compositions of the invention, especially liquids and wettable powders, contain as a conditioning agent one or more surface-active agents, sometimes called surfactants, in amounts sufficient to render a given composition containing the compounds of Formula I readily dispersible in water or in oil.

The surface-active agent used in this invention can be a wetting, dispersing, or emulsifying agent which will assist dispersion of the compound. The surface-active agent or surfactant can include such anionic, cationic, and non-ionic agents as have heretofore been generally employed in plant control compositions of similar type. Suitable surface-active agents are set forth, for example, in "Detergents and Emulsifiers," 1968 Annual by John W. McCutcheon, Inc.

In general, less than 10% by weight of the surface active agent will be used in compositions of this invention and ordinarily the amount of surface-active agents will range from 1–5% but may even be less than 1% by weight.

Additional surface-active agents can be added to the formulations to increase the ratio of surfactant: active ingredient up to as high as 5:1 by weight. Such compositions have a greater herbicidal effectiveness than can be expected from a consideration of the activity of the components used separately. When used at higher rates it is preferred that the surfactant be present in the range of one-fifth to five parts surfactant for each one part of active agent.

While conventional applications of sprayable formulations have usually been made in dilute form (for example, at a rate of about 200 liters per hectare or more); the compounds of this invention can also be used at higher concentrations in the typical "ultra-low-volume" or "low-volume" applications from aircraft or ground sprayers. For this purpose wettable powders can be dispersed in small amounts of aqueous or non-aqueous carriers. The suspension or emulsifiable concentrate can be used directly or with minor dilution. Special compositions, particularly suitable for ULV applications, are solutions or finely divided suspensions in one or more carriers such as dialkylformamides, N-alkylpyrrolidones, dimethyl sulfoxide, water, esters, ketones, glycols, glycol ethers and the like. Other suitable carriers include aromatic hydrocarbons (halogenated and non-halogenated), aliphatic hydrocarbons (halogenated and non-halogenated) and the like.

(A) Wettable powders.—Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the compounds of Formula I are of mineral origin.

The classes of extenders suitable for the wettable powder formulations of this invention are the natural clays, diatomaceous earths, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed in "Detergents and Emulsifiers," 1968 Annual by J. W. McCutcheon, Inc. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates; sulfated fatty alcohols, amines or acid amides; long chain acid esters of sodium isethionate, esters of sodium sulfosuccinate; sulfated or sulfonated fatty acid esters; petroleum sulfonates; sulfonated vegetable oils; and ditertiary acetylenic glycols. Preferred dispersants are methyl cellulose, polyvinyl alcohol, lignin sulfonates, polymeric alkylnaphthalene sulfonates, sodium naphthalene-sulfonate, polymethylene bis-naphthalenesulfonate, and sodium - N - methyl-N-(long chain acid)taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 15 to 90 weight percent active material, from 0.5 to 2.0 weight percent wetting agent, from 0.25 to 5.0 weight percent dispersant, and from 9.25 to 84.25 weight percent inert extender, as these terms are described above.

The following examples illustrate the wettable powder compositions of this invention and use thereof. All ingredients are shown as percent by weight unless otherwise stated.

EXAMPLE 16

| | Percent |
|---|---|
| 2,5 - bis(difluoromethyl) - 2,5-bis(trifluoromethyl)-4-oxazolidinone | 50 |
| Partially desulfonated sodium lignosulfonate | 3 |
| Dioctyl sodium sulfosuccinate | 1.5 |
| Kaolin | 45.5 |

The above ingredients are blended and hammer milled until essentially all particles of active ingredient are 50 microns or less.

The above herbicidal composition is used to control weeds in orchards (citrus, apples, peaches and pecans) and vineyards. It is suspended in sufficient water to allow uniform spray application at the rate of 4.5 kilograms active ingredient per hectare. Only orchards or vineyards established 2 or more years are treated. Care is taken to avoid contact with crop foliage or bark. Preemergence application controls common weeds such as crabgrass, giant foxtail, cheat, pigweed and nutsedge.

EXAMPLES 17–21

The following compounds can be substituted one at a time for 2,5-bis(difluoromethyl)-2,5-bis(trifluoromethyl)-4-oxazolidinone of Example 16 in like amount by weight. When formulated and applied in like manner, like results are obtained.

Example:
17—2,2,5,5-tetrakis(trifluoromethyl)-4-oxazolidinone
18—2,2,5,5-tetrakis(difluoromethyl)-4-oxazolidinone
19—2,5-bis(difluoromethyl)-2,5-bis(trifluoromethyl)-4-oxazolidinone, sodium salt
20—2,5-bis(chlorodifluoromethyl)-2,5-bis(trifluoromethyl)-4-oxazolidinone
21—2-difluoromethyl-2,5,5-tris(trifluoromethyl)-4-oxazolidinone

EXAMPLE 22

| | Percent |
|---|---|
| 2,5 - bis(difluoromethyl) - 2,5-bis(trifluoromethyl)-4-oxazolidinone, sodium salt | 75 |
| Methyl cellulose (low viscosity grade) | 1 |
| Sodium alkylnaphthalenesulfonate | 1 |
| Attapulgite | 23 |

After blending, the above ingredients are micropulverized until essentially all particles of active compound are 50 microns or less.

The composition shown above controls weeds in cotton when applied as a directed spray at layby (after last cultivation). The herbicide is applied to freshly worked soil pre-emergence to weeds at the rate of 2.2 kilograms per hectare actually sprayed. A minimum of 400 to 450 liters of water per hectare sprayed helps assure uniform application. Sprays are directed to the base of cotton plants when at least 50 cm. tall thereby minimizing foliage contact. Residual control of crabgrass, goosegrass, giant foxtail, pigweed, and other annual weeds continues several weeks.

EXAMPLE 23

| | Percent |
|---|---|
| 2 - difluoromethyl - 2,5,5 - tris(trifluoromethyl)-4-oxazolidinone | 25 |
| Oleic acid ester of sodium isethionate | 3 |
| Polyethoxylated nonylphenol | 1 |
| Diatomaceous silica | 71 |

The above ingredients are blended and micropulverized until essentially all particles of the active component are 50 microns or less.

The above herbicide provides long-term control of weeds on industrial sites (around storage tanks, pipelines, right-of-ways, etc.) when applied at the rate of 13.5 kilograms active ingredient per hectare. Application is made in sufficient water to allow uniform coverage of the soil surface. Pre-emergence treatment controls crabgrass, goosegrass, morningglory, ragweed, pigweed, nutsedge and certain other weeds.

EXAMPLES 24–28

The following compounds can be substituted one at a time for 2-difluoromethyl-2,5,5-tris(trifluoromethyl)-4-oxazolidinone of Example 23 in like amount by weight. When formulated and applied in like manner, like results are obtained.

Example:
24—2,5-bis(difluoromethyl)-2,5-bis(trifluoromethyl) 4-oxazolidinone
25—2,2,5,5 - tetrakis(trifluoromethyl) - 4 - oxazolidinone
26—2,2,5,5 - tetrakis(difluoromethyl) - 4 - oxazolidinone
27—2,5 - bis(difluoromethyl) - 2,5 - bis(trifluoromethyl)-4-oxazolidinone, sodium salt
28—2,5 - bis(chlorodifluoromethyl) - 2,5 - bis(trifluoromethyl)-4-oxazolidinone (B) High strength compositions and suspension concentrates.—High-strength compositions generally consist of 90 to 99.5% active ingredient and 0.5 to 10% of a liquid or solid surfactant such as those described in "Detergents and Emulsifiers," 1968 Annual. Such high-strength compositions can often be used in a manner similar to the wettable powders but they are also suitable for further formulation or for use in "ultra-low-volume" or "low-volume" applications.

The aqueous suspension concentrates are prepared by mixing together an aqueous slurry of water-insoluble active ingredient in the presence of dispersing agents. This mixture is then ground in a sand-mill, a ball-mill or the like and there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40% of active ingredient, from 45 to 70% water with the remainder made up of surfactants, corrosion inhibitors, and suspending agents.

Suspensions in organic liquids can be prepared in a similar manner by replacing the water with a suitable carrier such as mineral oil, in which the active compound has a solubility less than about 0.1%.

EXAMPLE 29

| | Percent |
|---|---|
| 2,2,5,5 - tetrakis(difluoromethyl)-4-oxazolidinone | 95 |
| Partially desulfonated sodium lignosulfonate | 3 |
| Dioctyl sodium sulfosuccinate | 1 |
| Finely divided silica | 1 |

The above ingredients are blended and hammer milled until essentially all particles of active ingredients are 50 microns or less.

Nutsedge and certain annual weeds are controlled in fallow land with 4.5 kilograms active ingredient per hectare of the above compound. Applied to clean soil or incorporated by disking, the herbicide provides weed control several weeks reducing the need for mechanical weed control while a crop is not being grown. The chemical is applied in sufficient volume of water to obtain uniform application (250 to 450 liters per hectare).

EXAMPLES 30–34

The following compounds may be substituted one at a time for 2,2,5,5-tetrakis(difluoromethyl)-4-oxazolidinone of Example 29 in like amount by weight. When formulated and applied in like manner, like results are obtained.

Example:
- 30—2,5 - bis(difluoromethyl) - 2,5 - bis(trifluoromethyl)-4-oxazolidinone, sodium salt
- 31—2,5 - bis(chlorodifluoromethyl) - 2,5 - bis(trifluoromethyl)-4-oxazolidinone
- 32—2 - difluoromethyl - 2,5,5 - tris(fluoromethyl)-4-oxazolidinone
- 33—2,5 - bis(difluoromethyl) - 2,5 - bis(trifluoromethyl)-4-oxazolidinone
- 34—2,2,5,5 - tetrakis(trifluoromethyl - 4 - oxazolidinone

EXAMPLE 35

| | Percent |
|---|---|
| 2,5 - bis(difluoromethyl) - 2,5 - bis(trifluoromethyl) 4-oxazolidinone, sodium salt | 99 |
| Finely divided silica | 1 |

After blending, the above materials are micropulverized until essentially all particles of active ingredient are 50 microns or less.

A solution of the above formulation controls weeds in corn when applied as a directed spray at layby (after last cultivation). The herbicide is applied to freshly worked soil pre-emergence to weeds at the rate of 1.0 kilograms per hectare actually sprayed. A minimum of 400 to 450 liters of water per hectare sprayed helps assure uniform application. The spray is directed to the base of corn plants when at least 50 cm. tall thereby minimizing foliage contact. Residual control of crabgrass, goosegrass, giant foxtail, pigweed, nutsedge and other weeds continues several weeks.

EXAMPLE 36

| | Percent |
|---|---|
| 2,5 - bis(chlorodifluoromethyl) - 2,5 - bis(trifluoromethyl) - 4-oxazolidinone | 25 |
| Lecithin | 5 |
| Non-phytotoxic hydrocarbon spray oil | 65 |
| Mixed polyoxyethylene ethers and oil soluble sulfonates | 5 |

The above ingredients are sandground until essentially all particles of active compound are 5 microns or less.

The above herbicide provides long-term control of weeds in non-crop sites such as along railroad right-of-ways and yards when applied at the rate of 27 kilograms active ingredient per hectare. Application is made in sufficient water to allow uniform coverage of the soil surface. Pre-emergence treatment controls crabgrass, goosegrass, morningglory, ragweed, pigweed, nutsedge and certain other weeds.

EXAMPLES 37–41

The following compounds may be substituted one at a time for 2,5 - bis(chlorodifluoromethyl)-2,5-bis(trifluoromethyl)-4-oxazolidinone of Example 36 in like amount by weight. After formulation and application in like manner, like results are obtained.

Example:
- 37—2,5-bis(difluoromethyl)-2,5-bis(trifluoromethyl)-4-oxazolidinone
- 38—2,2,5,5-tetrakis(trifluoromethyl)-4-oxazolidinone
- 39—2,2,5,5-tetrakis(difluoromethyl)-4-oxazolidinone
- 40—2,5-bis(difluoromethyl)-2,5-bis(trifluoromethyl)-4-oxazolidinone, sodium salt
- 41—2-difluoromethyl-2,5,5-tris(trifluoromethyl)-4-oxazolidinone

EXAMPLE 42

| | Percent |
|---|---|
| 2,5-bis(difluoromethyl) - 2,5 - bis(trifluoromethyl)-4-oxazolidinone | 30 |
| Goulac | 15 |
| Hydrated attapulgite | 1.5 |
| Water | 53.5 |

The above ingredients are sandground until essentially all particles of active component are 5 microns or less.

Pre-emergence sprays of the above compound control weeds in established woody ornamentals and nursery stock. The herbicide is applied before weeds emerge or to freshly cultivated soil at the rate of 2.2 kilograms active ingredient per hectare. A minimum of 400 to 450 liters of water per hectare sprayed helps assure uniform application. Sprays should be directed to the base of woody plants to avoid contact with foliage or stems. Residual control of crabgrass, goosegrass, giant foxtail, pigweed, nutsedge and other weeds continues several weeks.

EXAMPLES 43–46

The following compounds can be substituted one at a time for 2,5-bis(difluoromethyl)-2,5-bis(trifluoromethyl)-4-oxazolidinone of Example 42 in like amount by weight. When formulated and applied in like manner, like results are obtained.

Example:
- 43—2,2,5,5-tetrakis(trifluoromethyl)-4-oxazolidinone
- 44—2,2,5,5-tetrakis(difluoromethyl)-4-oxazolidinone
- 45—2,5-bis(chlorodifluoromethyl)-2,5-bis(trifluoromethyl)-4-oxazolidinone
- 46—2-difluoromethyl-2,5,5-tris(trifluoromethyl)-4-oxazolidinone (C) Dusts.—Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation, some liquid non-ionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust," a trademark of the American Agricultural Chemical Company.

Preferred grinding aids are attapulgite clay, diatomaceous earths, silica, synthetic fine silica and synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agent, corrosion inhibitors, and anti-foam agents may also be found as components of a dust.

Thus, the dust compositions of this invention will comprise about 2 to 20 weight percent active material, 0 to 50 weight percent absorptive filler, 0. to 1.0 weight percent wetting agent, and about 30 to 98 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

EXAMPLE 47

| | Percent |
|---|---|
| 2,2,5,5-tetrakis(trifluoromethyl)-4-oxazolidinone | 10 |
| Attapulgite | 20 |
| Pyrophyllite | 70 |

The active ingredient is blended with the attapulgite and ground in a hammer mill to obtain a concentrate which is then diluted into the finished dust by blending with the kaolinite followed by deagglomeration to obtain a uniform mixture.

The above formulation is applied at 5 grams/square meter to areas around the home where complete control of weeds is desired such as walkways, driveways, patios and under fences. When applied in this manner many troublesome weeds are controlled including common crabgrass, sheep sorrel, chickweed, henbit, common mallow, green foxtail, ryegrass, dandelion and plantain. This treatment provides weed control for several weeks eliminating many hours of hand weeding in difficult places.

EXAMPLES 48–52

The following compounds can be substituted one at a time for 2,2,5,5-tetrakis(trifluoromethyl)-4-oxazolidinone of Example 47 in like amount by weight. After formulation and application in like manner, like results are obtained.

Example:
48—2,2,5,5-tetrakis(difluoromethyl)-4-oxazolidinone
49—2,5-bis(difluoromethyl) - 2,5 - bis(trifluoromethyl)-4-oxazolidinone, sodium salt
50—2,5 - bis(chlorodifluoromethyl)-2,5-bis(trifluoromethyl)-4-oxazolidinone
51—2-difluoromethyl - 2,5,5 - tris(trifluoromethyl)-4-oxazolidinone
52—2,5 - bis(difluoromethyl)-2,5-bis(trifluoromethyl)-4-oxazolidinone

EXAMPLE 53

| | Percent |
|---|---|
| Wettable powder of Example 16 | 20 |
| Micaceous talc | 80 |

The above ingredients are blended and passed through a deagglomerator to obtain a uniform, finely divided dust.

Twenty-three kilograms per hectare of the above formulation are applied with a spreader around well established fruit trees (apple, peach, cherry, and citrus). The treatment is applied pre-emergence to the weeds and controls such weeds as nutsedge, Johnsongrass, giant foxtail, velvetleaf and crabgrass. Good weed control is obtained for several months.

It will also be understood that the wettable powders of Examples 17–21 can be substituted in the formulation of Example 53 for the wettable powder of Example 16 in like amount by weight. When formulated and applied in like manner, like results are obtained.

(D) Emulsifiable oils.—Emulsifiable oils are usually solutions of active material in water immiscible solvents together with a surfactant.

For the compounds of this invention, emulsifiable oils can be made by mixing the active ingredient with a solvent and surfactant. Suitable solvents for the compounds of this invention are aromatic hydrocarbons including many weed oils, chlorinated solvents, and water immiscible ethers, esters, or ketones. Suitable surfactants are those anionic or non-ionic agents known to the art as emulsifying agents. Such compounds can be found listed in "Detergents and Emulsifiers," 1968 Annual by John W. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan and sorbitol fatty acid esters, polyoxyethylene ethers with sorbitan and sorbitol fatty acid esters, polyethylene glycol esters with fatty or rosin acids, fatty alkylol amide condensates, calcium and amine salts of fatty alcohol sulfates, oil soluble petroleum sulfonates or, preferably, mixtures of these emulsifying agents. Such emulsifying agents will comprise from about 1 to 10 weight percent of the total composition. As described above, however, up to 5 parts of emulsifying agent for each part of active compound can be used.

Thus, emulsifiable oil compositions of the present invention will consist of from about 15 to 50 weight percent active material, about 40 to 84 weight percent solvent, and about 1 to 10 weight percent emulsifier, as these terms are defined and used above.

In some instances the oil solution may be intended merely for extension with other oils, such as weed oils. In this instance the emulsifying agents may be omitted and may be replaced by additional solvent.

EXAMPLE 54

| | Percent |
|---|---|
| 2,2,5,5-tetrakis(difluoromethyl)-4-oxazolidinone | 25 |
| Isophorone | 65 |
| Mixed polyoxyethylene ethers and oil soluble sulfonates | 10 |

The active ingredient and emulsifier are added to the isophorone in a vessel equipped with an agitator. A homogeneous solution results which may be added to water to prepare a sprayable emulsion or may be extended by the addition of non-phytotoxic spray oils. The emulsifiable solution may be used, with or without such dilution, for "ultra-low-volume" or "low-volume" spray applications.

Four and one half kilograms of the above active ingredient are emulsified in 450 liters of water and applied as a directed post-emergence spray application on a hectare of field corn. The treatment is applied when the corn plants are 35 cm. tall or taller being careful not to spray the corn plants but yet completely covering the weeds. Many weeds are controlled including common ragweed, crabgrass, pigweed, goosegrass, and barnyardgrass.

EXAMPLES 55–58

The following compounds may be substituted one at a time for 2,2,5,5-tetrakis(difluoromethyl)-4-oxazolidinone of Example 54 in like amount by weight. After formulation and application in like manner, like results are obtained.

Example:
55—2,2,5,5-tetrakis(trifluoromethyl)-4-oxazolidinone
56—2,5-bis(difluoromethyl) - 2,5 - bis(trifluoromethyl)-4-oxazolidinone
57—2,5-bis(chlorodifluoromethyl) - 2,5 - bis(trifluoromethyl)-4-oxazolidinone
58—2 - difluoromethyl-2,5,5-tris(trifluoromethyl)-4-oxazolidinone

EXAMPLE 59

| | Percent |
|---|---|
| 2,5 - bis(chlorodifluoromethyl)-2,5-bis(trifluoromethyl)-4-oxazolidinone | 5 |
| Alkylated naphthalenes | 85 |
| Mixed polyoxyethylene ethers and oil soluble sulfonates | 10 |

The above ingredients are mixed in a stirred vessel until a homogeneous solution results. This solution can be used to prepare sprayable emulsions or an as "ultra-low-volume" or "low-volume" concentrate.

Five kilograms of the active ingredient are emulsified in 400 liters of water and applied as a directed post-emergence spray application on a hectare of cotton. The treatment is applied when the cotton plants are 30 cm. tall or taller and is directed below the cotton plants on the weeds. The treatment provides control of many weeds such as barnyardgrass, witchgrass, teaweed, crabgrass, and yellow rocket.

EXAMPLES 60–63

The following compounds can be substituted one at a time for 2,5-bis(chlorodifluoromethyl)-2,5-bis(trifluoromethyl)-4-oxazolidinone of Example 59 in like amount by weight. When formulated and applied in like manner, like results are obtained.

Example:

60 2,5 - bis(difluoromethyl) - 2,5 - bis(trifluoromethyl)-4-oxazolidinone 61 2,2,5,5 - tetrakis(trifluoromethyl) - 4 - oxazolidinone 62 2,2,5,5 - tetrakis(difluoromethyl) - 4 - oxazolidinone 63 2 - difluoromethyl - 2,5,5 - tris(trifluoromethyl)-4-oxazolidinone (E) Granules and pellets.—Granules and pellets are physically stable, particulate compositions containing a compound of Formulae I and II which adheres to or is distributed through a basis matrix of a coherent, inert carrier with macroscopic dimensions. In order to aid leaching of the active ingredient from the granule or pellet, a surfactant can be present. Such surfactants are listed in "Detergents and Emulsifiers," 1968 Annual by J. W. McCutcheon, Inc.

For the granule compositions of this invention, most suitable carriers are of two types. The first are preformed granules, such as preformed and screened granular attapulgite granular corn cobs, or heat-expanded, granular, screened vermiculite. On any of these, a solution of the active agent can be sprayed and will be absorbed at concentrations up to 25 weight percent of the total weight or else fine powders plus a binder can be applied to provide a surface coating of active material. The second, which are also suitable for pellets, are initially powdered kaolin clays, hydrated attapulgite, or bentonite clays in the form of sodium, calcium or magnesium bentonites, or gypsum. Water-soluble salts, such as sodium and ammonium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component, but more frequently a concentration of about 10 weight percent is desired for optimum distribution. The granular compositions of this invention are most useful in a size range of 15–60 mesh (i.e. about 1.25 mm. to about 0.25 mm.).

The most suitable wetting agents for the granular compositions of this invention depend upon the type of granule used. When preformed granules are sprayed with active material in liquid form the most suitable wetting agents are non-ionic, liquid wetters miscible with the solvent. These are compounds more generally known to the art as emulsifiers, and comprise alkylaryl polyether alcohols, alkyl polyether alcohols, polyoxyethylene sorbitan or sorbitol fatty acid esters, polyethylene glycol esters with fatty or rosin acids, fatty alkylol amide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 2 to 30 weight percent active material, about 0 to 5 weight percent of surface active agent, and about 65 to 98 weight percent of inert mineral carrier and water-soluble salts, as these terms are used herein.

EXAMPLE 64

| | Percent |
|---|---|
| 2,2,5,5-tetrakis(trifluoromethyl)-4-oxazolidinone | 10 |
| Goulac | 5 |
| Preformed clay granules, 15–30 mesh (1.25–0.60 mm.) | 85 |

A mixture of the active ingredient and goulac is micropulverized until essentially all particles of active material are 50 microns or less and then blended with the granules in a rotary mixer. While the blend is tumbling in the mixer, it is sprayed with a fine mist of water to promote an adherent coating of active compound on essentially all of the clay granules.

Forty-five kilograms of the above granules are uniformly distributed over a hectare of Irish potatoes at layby (last cultivation). This treatment provides control of many annular weeds until harvest making harvesting easier and more efficient. Some of the weed species controlled include nutsedge, pigweed, giant foxtail, and lambsquarter. Light incorporation by cultivation improves control of nutsedge.

EXAMPLES 65–69

The following compounds may be substituted one at a time for 2,2,5,5-tetrakis(trifluoromethyl)-4-oxazolidinone of Example 64 in like amount by weight. After formulation and application in like manner, like results are obtained.

Example:

65—2,5 - bis(difluoromethyl) - 2,5-bis(trifluoromethyl)-4-oxazolidinone

66—2,2,5,5 - tetrakis(difluoromethyl) - 4 - oxazolidinone

67—2,5 - bis(difluoromethyl) - 2,5-bis(trifluoromethyl)-4-oxazolidinone, sodium salt 68—2,5 - bis(chlorodifluoromethyl)-2,5-bis(trifluoromethyl)-4-oxazolidinone 69—2 - difluoromethyl - 2,5,5 - tris(trifluoromethyl)-4-oxazolidinone

EXAMPLE 70

| | Percent |
|---|---|
| 2,5 - bis(difluoromethyl) - 2,5-bis(trifluoromethyl)-4-oxazolidinone | 20 |
| Sodium alkylnaphthalenesulfonate | 1 |
| Hydrated attapulgite | 10 |
| Kaolin | 69 |

The active ingredient is hammer milled until essentially all particles are 50 microns or less and then blended with the other ingredients. After moistening the blend with approximately 10% water, the product is granulated and then dried. The dried granules are screened to obtain the 15–30 mesh (1.25–0.60 mm.) fraction; off-size granules can be returned to the process.

Fifteen kilograms of the above granules are uniformly distributed over a hectare of asparagus before the spears appear in the spring and provides control of such weeds as barnyardgrass, teaweed, Johnsongrass and common ragweed. Good weed control is obtained for several months.

EXAMPLES 71–75

The following compounds may be substituted one at a time for 2,5-bis(difluoromethyl)-2,5-bis(trifluoromethyl)-4-oxazolidinone of Example 70 in like amount by weight. When formulated and applied in like manner, like results are obtained.

Example:
71—2,2,5,5-tetrakis(trifluoromethyl)-4-oxazolidinone
72—2,2,5,5-tetrakis(difluoromethyl)-4-oxazolidinone
73—2,5-bis(difluoromethyl)-2,5-bis(trifluoromethyl)-4-oxazolidinone, sodium salt
74—2,5-bis(chlorodifluoromethyl)-2,5-bis(trifluoromethyl)-4-oxazolidinone
75—2-difluoromethyl-2,5,5-tris(trifluoromethyl)-4-oxazolidinone

EXAMPLE 76

|  | Percent |
|---|---|
| 2,5-bis(difluoromethyl) - 2,5 - bis(trifluoromethyl)-4-oxazolidinone, sodium salt | 25 |
| Polyoxyethylated nonylphenol | 2 |
| Water | 73 |

Twenty parts of the above solution is sprayed onto the surface of 80 parts of 15–30 mesh (1.25–0.60 mm.) preformed clay granules. After drying, the granules are uniformly applied at fifteen kilograms per hectare to industrial areas where control of vegetation is desired. Such areas include: around oil storage tanks, under pipelines, along railroad tracks, around loading and unloading docks, along fences, and around buildings. The granules are applied early in the spring before weed infestation becomes severe and will provide control of most monocot and dicot weeds that normally infest such areas. Residual weed control is provided for several months reducing potential fire hazards and improving appearances.

What is claimed is:
1. A method for controlling undesired vegetation comprising applying to the locus to be protected a herbicidally effective amount of a compound having the formula

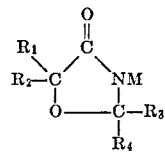

where:
M is selected from the group consisting of hydrogen, an alkali metal ion, an alkaline earth metal ion, and

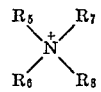

where $R_5$, $R_6$, $R_7$ and $R_8$ are the same or different and are selected from the group consisting of hydrogen, alkyl having 1 to 4 carbon atoms, and alkyl having 1 to 4 carbon atoms substituted with one hydroxy group, and $R_1$, $R_2$, $R_3$, and $R_4$ are the same or different and are selected from the group consisting of trifluoromethyl, difluoromethyl, and chlorodifluoromethyl.

2. The method of claim 1 wherein the compound is 2,5 - bis(difluoromethyl) - 2,5 - bis(trifluoromethyl)-4-oxazolidinone.

3. The method of claim 1 wherein the compound is 2,2,5,5-tetrakis(difluoromethyl)-4-oxazolidinone.

4. The method of claim 1 wherein the compound is 2,5 - bis(difluoromethyl) - 2,5 - bis(trifluoromethyl)-4-oxazolidinone, sodium salt.

5. The method of claim 1 wherein the compound is 2 - difluoromethyl - 2,5,5 - tris(trifluoromethyl)-4-oxazolidinone.

6. The method of claim 1 wherein the compound is 2,2,5,5-tetrakis(trifluoromethyl)-4-oxazolidinone.

References Cited
UNITED STATES PATENTS

| 3,310,570 | 3/1967 | Middleton | 260—299 |
| 2,856,277 | 10/1958 | Bluestone et al. | 71—88 |

JAMES O. THOMAS, JR., Primary Examiner